US008498758B1

(12) United States Patent
Bell et al.

(10) Patent No.: US 8,498,758 B1
(45) Date of Patent: Jul. 30, 2013

(54) ILS-BASED ALTITUDE DATA GENERATION SYSTEM, DEVICE, AND METHOD

(71) Applicant: Rockwell Collins, Inc., Cedar Rapids, IA (US)

(72) Inventors: Douglas A Bell, Marion, IA (US); James H. Doty, Cedar Rapids, IA (US); Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/685,218

(22) Filed: Nov. 26, 2012

Related U.S. Application Data

(63) Continuation-in-part of application No. 13/566,350, filed on Aug. 3, 2012, now Pat. No. 8,321,074.

(51) Int. Cl.
*G05D 1/00* (2006.01)

(52) U.S. Cl.
USPC .......... 701/4; 701/1; 701/3; 701/13; 701/408; 701/416; 701/460; 701/495; 244/75.1; 244/180; 244/185; 244/188; 244/191; 342/33; 342/38; 342/65; 342/140; 342/149

(58) Field of Classification Search
USPC .............. 701/1, 3, 4, 13, 408, 416, 460, 495; 244/75.1, 180, 188, 191, 195, 197
See application file for complete search history.

(56) References Cited

U.S. PATENT DOCUMENTS

| 3,177,484 | A  | * | 4/1965  | Case, Jr. et al. ................ 342/33 |
| 6,094,607 | A  | * | 7/2000  | Diesel ................................ 701/4 |
| 7,619,556 | B1 | * | 11/2009 | McCusker ...................... 342/33 |
| 2003/0030582 | A1 | * | 2/2003 | Vickers ........................... 342/54 |

* cited by examiner

*Primary Examiner* — Redhwan k Mawari
(74) *Attorney, Agent, or Firm* — Donna P. Suchy; Daniel M. Barbieri

(57) ABSTRACT

Present novel and non-trivial system, device, and method for generating altitude data and/or height data are disclosed. A processor receives navigation data from an external source such as a global positioning system ("GPS"); receives navigation data from multiple internal sources; receives object data representative of terrain or surface feature elevation; determines an instant measurement of aircraft altitude as a function of these inputs; and generates aircraft altitude data responsive to such determination. In an additional embodiment, the processor receives reference point data representative of the elevation of the stationary reference point (e.g., a landing threshold point); determines an instant measurement of aircraft height as a function of this input and the instant measurement of aircraft altitude; and generates aircraft height data responsive to such determination.

27 Claims, 7 Drawing Sheets

ILS-BASED ALTITUDE DATA GENERATION SYSTEM, DEVICE, AND METHOD

CROSS-REFERENCE TO RELATED APPLICATIONS

This application in a continuation-in-part and claims the benefit of U.S. Non-Provisional application Ser. No. 13/566,350 filed on Aug. 3, 2012 and entitled "Altitude Data Generation System, Device, and Method" which is incorporated by reference.

BACKGROUND OF THE INVENTION

1. Field of the Invention

This invention pertains generally to the field of navigation systems such as, but not limited to, aircraft navigation systems.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") published by the United States ("U.S.") Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation."

A low-visibility instrument approach procedure ("IAP") that permits a pilot to operate to a lower altitude than permitted by a standard Instrument Landing Systems ("ILS") (which is generally 200 feet height above threshold ("HATh")) without visually identifying the runway environment may require the use of a radio altimeter system to define a missed approach point represented to the pilot as a decision height ("DH").

In determining the DH, an aviation-governing authority such as the FAA surveys the approach corridor to the runway to determine the DH relative to the runway. In order to achieve lower minima (i.e., lower DH) for IAPs based upon a satellite navigation system such as the Global Positioning System ("GPS"), preparations have begun in the U.S. to implement the Next Generation Air Transport System ("NextGen"), a system designed to reduce the stress currently experienced by the U.S and address the expected growth in aircraft operations forecasted through 2025. At the time of this writing, the lowest minima for GPS-based approaches such as the Localizer Performance with Vertical Guidance ("LPV") include a DH of 200 feet HATh. To achieve a lower DH, surveys of approach corridors will mean a survey more than 2,700 GPS IAPs, the amount of such procedures available in the U.S.; moreover, in the next five years, there is a potential of more than 5,000 such procedures, many of which could include the use of a radar altimeter system(s) when determining the DH. In addition, the height value of the DH may differ between airports where the relative terrain in the approach corridor is unique.

The radar altimeter system produces radar altimeter readings that are independent of aircraft decent rate. Because of "noise" produced in a radar altimeter system and because of variations in terrain elevations, the height above terrain measured by the radar altimeter system may change quickly. Also, the inclusion of the radar altimeter system in an IAP may require the aviation-governing authority to perform routine ground maintenance in the approach corridor so that obstacles such as trees and towers do not present false readings. A significant amount of the pilot's attention may be needed when watching for the arrival at the decision height when such conditions exist.

RNP may include performance and functional requirements indicated by the RNP type. The RNP type defines the total system error ("TSE") that may be allowed in lateral and longitudinal dimensions within a particular airspace, where the TSE takes into account path definition errors ("PDE"), navigation system errors ("NSE"), and flight technical errors ("FTE"). The RNP type is used to specify navigation requirements for the airspace or a navigation system that provides a specified level of accuracy defined by a lateral area of confined airspace in which an RNP-certified aircraft operates. For example, an RNP 0.3 level requires a normal navigational accuracy of 0.3 nautical miles ("NM") at least 95 percent of the total flight time; similarly, an RNP 0.1 level requires a normal navigational accuracy of 0.1 NM at least 95 percent of the total flight time. Hence, a lower level of RNP means a greater level of navigational accuracy. With the availability of GPS, future airspace systems may rely heavily on GPS-based navigation to which stringent standards for NSE may be applied. An IAP specifying an RNP level of less than RNP 0.3 or lower than the standard minima at airports not equipped with Instrument Landing Systems ("ILS") airports may require a method to detect GPS position errors before the 6.2 second time-to-alert standard that currently exists. A similar requirement may be made for manufacturers and/or end-users wishing to take advantage of the standards published in RTCA DO-315B entitled "Minimum Aviation System Performance Standards (MASPS) for Enhanced Vision Systems, Synthetic Vision Systems, Combined Vision Systems and Enhanced Flight Vision Systems."

One way to achieve a greater level of navigational accuracy is to reduce the TSE. Because the TSE may be comprised of the PDE, NSE, and FTE, a reduction of any of these—such as the NSE—could reduce the TSE which, in turn, could produce a greater level of navigational accuracy. A reduction of NSE could be obtained by monitoring and/or augmenting navigation data provided by one or more navigation systems with an independent source of navigation data. Such independent source could be used to generate altitude and/or height data.

The independent source could also be used to validate the navigation system navigation data by confirming the navigation system navigation data falls within lower desired tolerances commensurate with a lower NSE. The use of an independent source to validate navigation system navigation data is disclosed by Bell et al in a separate an application entitled "Navigation Data Validation Systems and Methods," which is hereby incorporated by reference in its entirety.

BRIEF SUMMARY OF THE INVENTION

The embodiments disclosed herein present novel and non-trivial system, device, and method for generating altitude data for use onboard an aircraft during an approach-for-landing phase of flight. With the embodiments disclosed herein, data from SBAS-aided satellite navigation system, an inertial system, an air-data computer system, a radar altimeter system, a source of terrain data, and a source of runway data may be employed to generate altitude and/or height data and present altitude and/or height information to the pilot. A measurement of HATh as disclosed herein may rely on the measurements produced from these sources and produce a measurement that is inertially-smoothed, less noisy, and measured with reference to a fixed reference point of the runway. As such, changes in the HATh could be correlated to the aircraft decent rate and the fixed reference point, thereby providing a higher level of pilot predictability by presenting a common DH for IAPs that is independent of a measurement of terrain while reducing pilot workload and simplifying pilot training because each IAP could use the same DH.

In one embodiment, a system for generating altitude data is disclosed. The system may be comprised of multiple sources of navigation data, a source of object data representative of terrain or surface feature elevation, and a processor for generating altitude data. In an additional embodiment, the system may also be comprised of a source of reference point data representative of the elevation of the stationary reference point (e.g., a landing threshold point) from which the processor may generate height data.

In another embodiment, a device such as the processor for generating altitude data is disclosed. This device may be configured to generate altitude data based upon the navigation data and the object data. The altitude data could be representative of an instant measurement of aircraft altitude. In an additional embodiment, the device may be configured to generate height data based upon the altitude data and reference point data. The height data could be representative of an instant measurement of aircraft height.

In another embodiment, a method for generating altitude data is disclosed, where the method could be performed by the processor. When properly configured, the processor may receive the navigation data from the multiple sources; receive the object data; and generate altitude data based upon the navigation data and the object data. In additional embodiment, the processor may receive the reference point data, and generate altitude data based upon the reference point data and the altitude data.

BRIEF DESCRIPTION OF THE DRAWINGS

The drawings of FIG. 1 depict a functional block diagram of a system for generating altitude data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
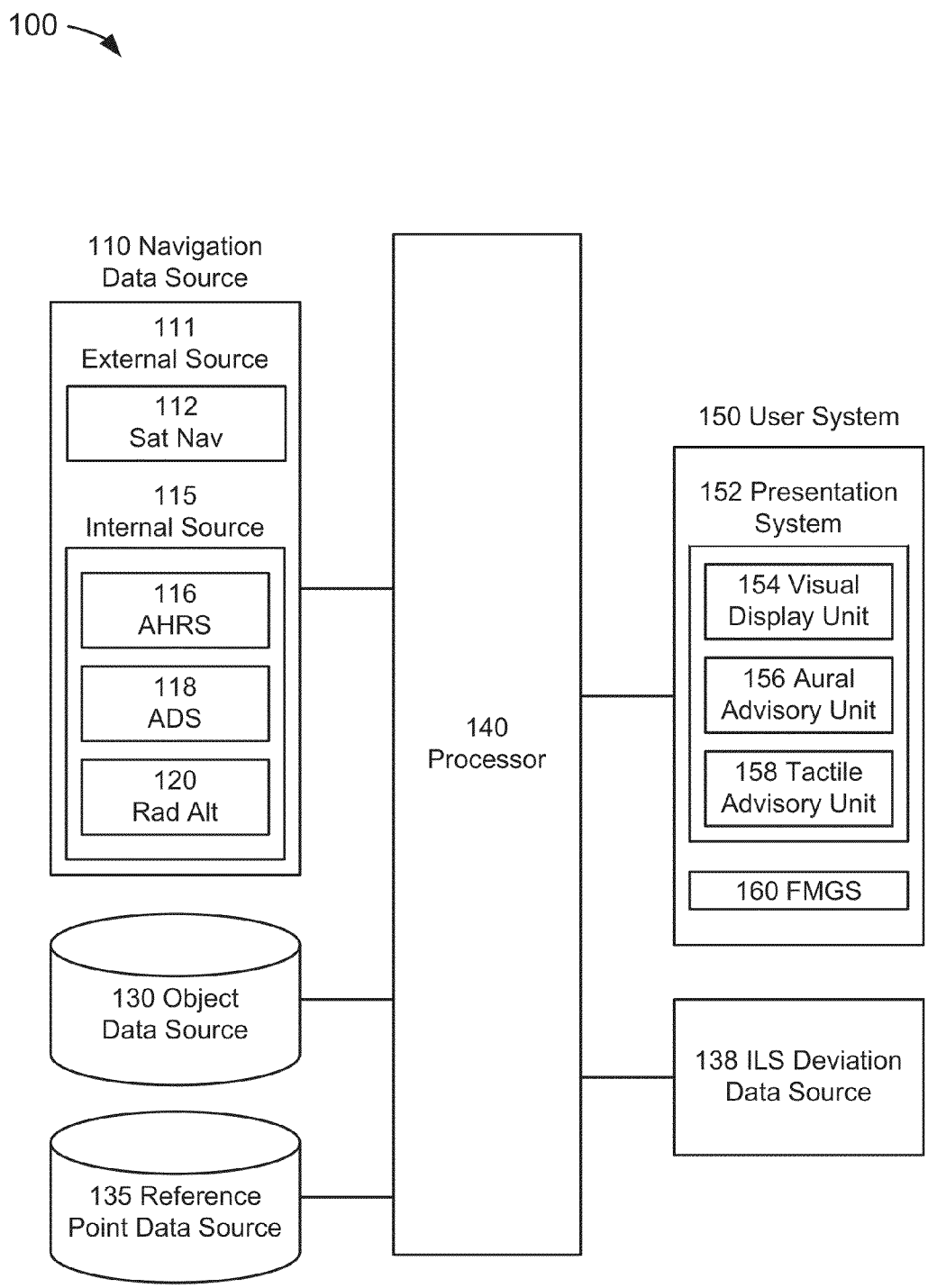

FIG. 1 depicts a functional block diagram of an altitude data generation system 100 suitable for implementation of the techniques described herein. The functional blocks of the system may include a navigation data source 110, an object data source 130, a reference point data source 135, a processor 140, and a user system 150.

In an embodiment of FIG. 1, the navigation data source 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

The navigation data source 110 could be comprised of, but not limited to, an external source 111 and/or an internal source 115. The external source 111 may refer to a data source which acquires raw data from a source external to the aircraft, and the internal source 115 may refer to a data source which acquires raw data from a source internal to the aircraft. For both types of sources, the raw data could be data from which navigation data may be determined.

An example of an externally-sourced navigation data source 111 is a satellite navigation system ("Sat Nav") 112. From the external source 111, navigation data such as aircraft position data comprised of geographic position (e.g., latitude and longitude coordinates) data and altitude data may be determined and provided as output. In addition, data representative of the quality of the navigation data may be provided by the navigation data source 110, where such data may include parameters associated with, but not limited to, accuracy, resolution, integrity, uncertainty, and/or validity. Those skilled in the art understand that quality of navigation data could depend on the system providing the data, e.g., an air/data system, an attitude heading reference system, an inertial guidance system (or inertial reference system), a global navigation satellite system (or satellite navigation system), and a flight management computing system. Furthermore, the quality of navigation data provided by a system could depend on other considerations.

The quality of navigation data provided by the Sat Nav 112 could depend on other considerations such as whether an augmentation system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FAA may deliver better quality of data than a WAAS by providing extremely high parameters of accuracy, availability, and integrity; for example, a LAAS has demonstrated an accuracy of less than 1 meter in both the horizontal and vertical axes.

Examples of an internally-sourced navigation data source 115 could include, but not be limited to, an attitude heading reference system ("AHRS") 116, an air/data system ("ADS") 118, and a radar altimeter system ("Rad Alt") 120 (the term "radar altimeter" is also known as "radio altimeter" to those skilled in the art). The AH RS 116 could be representative of any system in which navigation data is derived from inertial sensors such as accelerometers for measuring motion on the axes of an aircraft and/or gyroscopes for measuring rotation about the axes. Known to those skilled in the art and depending on the specific configuration, the AHRS 116 is an inertial system that could provide output data representative of heading, pitch, roll, body rate and accelerations, and/or vertical acceleration from which vertical velocity data may be derived, where vertical velocity data may be considered vertical travel data representative of a vertical distance traveled over a period of time. As disclosed herein, data which may be used to measure vertical movements may be considered vertical travel data.

The ADS 118 could be representative of any system in which navigation data is derived from an aircraft's pitot-static system and the sensors thereof. Known to those skilled in the art, the ADS 118 could provide output data representative of barometric altitude, corrected barometric altitude, altitude trend, computed airspeed, true airspeed, mach number, static air temperature, and/or total air temperature.

The Rad Alt 120 could be representative of any system in which navigation data is derived by measuring the height above the terrain directly beneath an aircraft. Known to those skilled in the art, the Rad Alt 120 could provide output data representative of an aircraft radar altitude, i.e., height above terrain. As embodied herein, the navigation data source 110 could provide navigation data to the processor 140 for subsequent processing as discussed in detail below.

As discussed above, the quality of navigation data provided by the navigation data source 110 may depend upon one or more quality parameters such as, but not limited to, accuracy, resolution, integrity, uncertainty, and/or validity. Due to the quality of navigation data, there could be a difference between the altitude information provided by the Sat Nav 112 and the actual altitude of the aircraft. For example, aircraft geographic position information provided by the Sat Nav 112 may agree with the aircraft geographic position but altitude information provided by the Sat Nav 112 may not agree with the actual altitude of the aircraft because of poor quality of altitude data.

In such instances, an aircraft radar system may be used to generate altitude data which in turn, may be used to verify other source(s) of altitude data; this was disclosed by Bell et al in U.S. patent application Ser. No. 12/892,546 entitled "Systems and Methods for Generating and Verifying Altitude Data," which is incorporated by reference in its entirety. In other instances, the aircraft radar system may be used to generate height above a reference point data which in turn, may be used to validate other source(s) of altitude data; this was disclosed by McCusker in U.S. patent application Ser. No. 13/193,788 entitled "Systems and Methods for Generating Aircraft Altitude Height and Employing Such Height Data to Validate Altitude Data," which is incorporated by reference in its entirety.

Besides the quality of navigation data provided by one source, the quality of navigation data could differ between navigation data sources 110. For example, the barometric altitude information provided by the ADS 118 may not agree with altitude information provided by the Sat Nav 112; moreover, each of these may not agree with the actual altitude of the aircraft. In order to use the altitude information provided by the externally-sourced navigation data source 111, the internally-sourced navigation data sources 115 may be integrated with each other and with the externally-sourced navigation data source 111 and used to validate navigation data as discussed in detail below.

Also, the quality of altitude information and/or height information provided by one or more of the navigation data sources 110 may not be suitable for one or more specific flight operations. As such, the navigation data sources 110 may not be suitable individual sources of altitude data for deriving other information such as height above [landing] threshold ("HATh") information, where HATh may be derived by subtracting elevation of the LTP (provided by the reference point data source 135) from aircraft altitude. Despite disagreements between sources, navigation data representative of aircraft altitude and/or aircraft height information may be generated by integrating the navigation data provided by both the externally-sourced navigation data source 111 and the internally-sourced navigation data sources 115 as discussed in detail below.

In an embodiment of FIG. 1, the object data source 130 could be comprised of one or more sources of object data that could be comprised of terrain data and/or surface feature data. The object data source 130 could be comprised of, but is not limited to, a terrain database configured to store terrain data contained in digital elevation models ("DEM"). Generally, the terrain data of a DEM are stored as grids, and each grid represents an area of terrain and is commonly referred to as a terrain cell. The object data source 130 could be a database configured to store data representative of surface features such as, but not limited to, obstacles, buildings, lakes and rivers, and paved or unpaved surfaces. The object data source 130 is a data source known to those skilled in the art.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

In an embodiment of FIG. 1, the reference point data source 135 could be comprised of any source of reference point data. The reference point data source 135 may include, but is not limited to, a flight navigation database that may be part of a flight management system ("FMS") and/or a taxi navigation database. Although not limiting to the embodiments disclosed herein, the reference point data source 135 could be a database designed to meet the standards published by Aeronautical Radio, Incorporated ("ARINC") in the following document: ARINC Specification 424-18 entitled "Navigations Systems Data Base" ("ARINC 424"), an aviation industry standard known to those skilled in the art.

The flight navigation database may contain records which provide reference data such as, but not limited to, runway data such as LTP data, airport data, and/or approach data. Generally, the LTP of a runway may be the point where the runway centerline intersects the runway threshold of a runway, where the LTP has a defined geographic position and/or elevation. Data representative of the geographic position and/or elevation of the LTP may be stored in the reference point data source 135. Although the reference points in the following discussion may be drawn to LTPs, the disclosures herein are not limited to LTPs but may include any point having a defined geographic position and/or elevation.

The flight navigation database could also store data associated with ground-based navigational aids such as the instrument landing system ("ILS"), waypoints, holding patterns, airways, airports, heliports, instrument departure procedures, instrument arrival procedures, IAPs, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems. Such flight navigation database could be provided by an aircraft system such as, but not limited to, an FMS.

The taxi navigation database could store airport data that may be representative of, in part, airport surfaces and airport visual aids. The taxi navigation database could comprise an aerodrome mapping database ("AMDB") as described in the following document published by RTCA, Incorporated: RTCA DO-272A entitled "User Requirements for Aerodrome Mapping Information." DO-272A provides for aerodrome surface mapping requirements for aeronautical uses particularly on-board aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB. As embodied herein, the reference point data source 135 could provide reference point data to the processor 140 for subsequent processing as discussed herein.

In an embodiment of FIG. 1, the ILS deviation data source 138 could be any device known to those skilled in the art for measuring the angular deviation between an aircraft and a desired course to a runway and a desired glide slope, where the desired course to the runway may coincide with a runway alignment axis. The ILS deviation data source 138 could be an ILS receiver installed in an aircraft that is linked to a localizer antenna and a glide slope antenna. The ILS receiver could be configured for receiving and demodulating localizer and glide slope signals propagated by ground-based localizer and glide slope transmitters. After the signals have been demodulated, ILS receiver data representative of, in part, angular localizer and glide slope deviation information may be generated by the ILS receiver and provided to the processor 140.

In an embodiment of FIG. 1, the processor 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 140 could be a processor(s) used by or in conjunction with any other system of the aircraft including, but not limited to, the navigation data source 110, the aircraft radar system 120, the object data source 130, the reference point data source 135, the user system 150, an FMS, or any combination thereof.

The processor 140 may be programmed or configured to receive as input data representative of information obtained from various systems and/or sources including, but not limited to, the navigation data source 110, the object data source 130, and the reference point data source 135. As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 140 may be programmed or configured to execute one or both of the methods discussed in detail below. The processor 140 may be programmed or configured to provide output data to various systems and/or units including, but not limited to, the user system 150.

In an embodiment of FIG. 1, the user system 150 could be comprised of any system that may use instant altitude data and/or instant height data of an instant vertical distance above the stationary reference point such as HATh, respectively. Examples of the user system 150 include, but are not limited to, a presentation system 152 and a flight management and guidance system ("FMGS") 160. The user system 150 could also include the navigation data source 110 and/or a symbology generator which requires an input of altitude data in the generation of symbology such as visual indications related to an aircraft's glide path and/or approach path to a runway.

The presentation system 152 could be comprised of a visual display unit 154, an aural advisory unit 156, and/or a tactile advisory unit 158 for presenting the pilot with aircraft altitude information and/or aircraft height information. As embodied herein, the visual display unit 154 may include a vision system (not shown) which generates an image data set which represents the image displayed on a display unit. Vision systems could include, but are not limited to, a synthetic vision system ("SVS"), an enhanced vision system ("EVS"), and/or a combined SVS-EVS.

The visual display unit 154 could be comprised of any unit which may present the pilot with visual information or indications regarding the aircraft altitude information and/or aircraft height information. The visual display unit 154 could be comprised of, but not limited to, a Primary Flight Director, Navigation Display, Head-Down Display, Head-Up Display, Multipurpose Control Display Unit, Engine Indicating and Crew Alerting System, Electronic Centralized Aircraft Monitor, Multi-Function Display, Side Displays, and Data Link Control Display Unit. As embodied herein, the disclosures may apply to a portable device including, but not limited to, tablets which employ a display unit and/or aural alert unit.

Figure 2A:
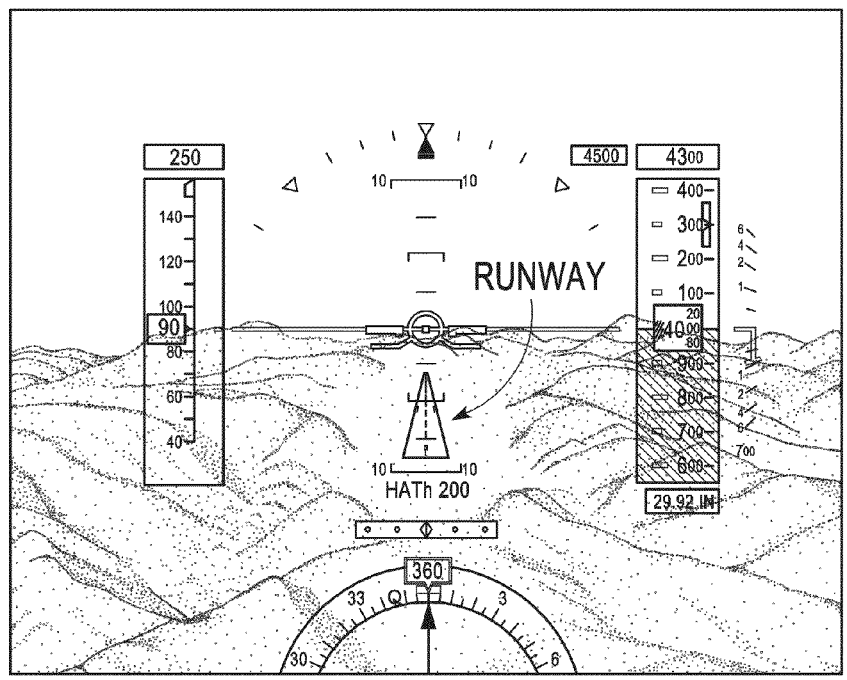
FIG. 2A depicts an exemplary illustration of an image on a Head-Down Display ("HDD") unit depicting a scene outside the aircraft with symbology providing flight information including altitude and height above threshold ("HATh") information.

Referring to FIG. 2A, an exemplary depiction of an HDD unit for presenting information to the pilot or flight crew against the background of a three-dimensional image of terrain and sky is presented; the HDD unit could be employed as a display unit in an SVS, an EVS, or a combined SVS-EVS. It should be noted that the information depicted on the HDD unit (and the HUD unit of FIG. 2B) has been minimized for the sake of presentation and is not indicative of the plurality of indications or information with which it may be configured.

Figure 2B:
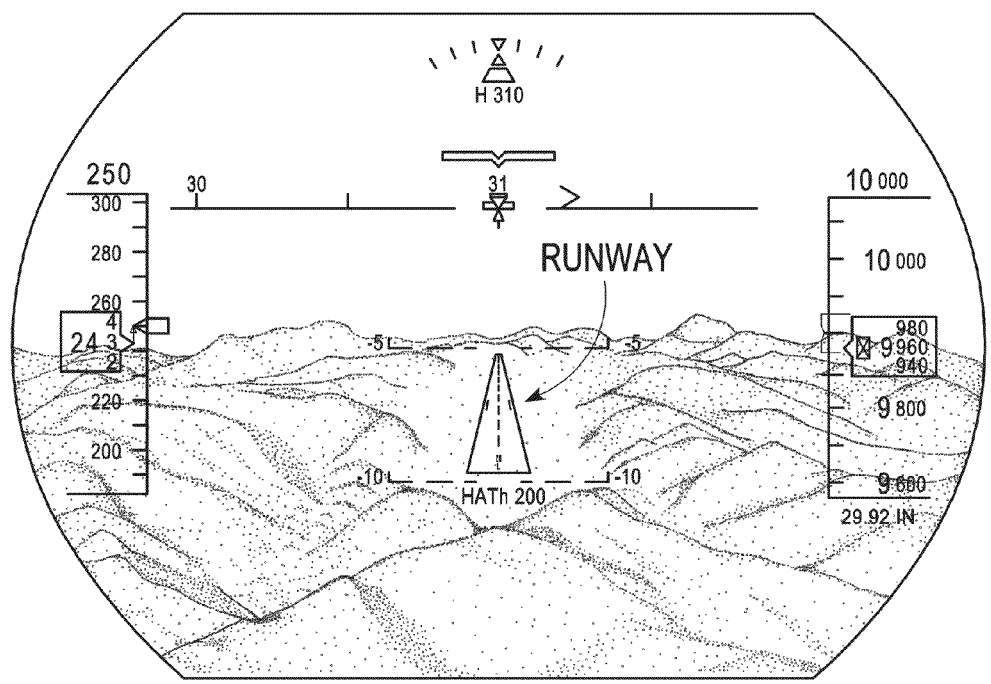
FIG. 2B depicts an exemplary illustration of an image on a Head-Up Display ("HUD") unit depicting a scene outside the aircraft with symbology providing flight information including altitude and HATh information.

Referring to FIG. 2B, an exemplary depiction of a HUD unit for presenting information to the pilot or flight crew against the background of a three-dimensional image of terrain and sky is provided; a HUD unit could be employed as display unit in an SVS, an EVS, or a combined SVS-EVS. Because the indications or information shown in FIGS. 2A and 2B are well-known to those skilled in the art, a discussion of the specific information shown is not provided herein; however, it should be noted that altitude information comprised of "4000" (in FIG. 2A) and "9960" (in FIG. 2B) is presented on the right-hand sides of HDD unit and HUD unit, respectively, and HATh information comprised of "HATh 200" is presented below the runways.

Returning to FIG. 1, the aural advisory unit 156 may be any unit capable of producing aural advisories. Aural advisories may be discrete sounds, tones, and/or verbal statements used to annunciate a condition, situation, or event. In one embodiment, an aural advisory could call out the value(s) of the aircraft altitude and/or HATh.

The tactile advisory unit 158 may be any unit capable of producing tactile alerts. Tactile alerts may be any tactile stimulus to present a condition, situation, or event to the pilot. As embodied herein, tactile alerts could be presented in combination with or simultaneous to visual alerts and/or aural alerts.

In an embodiment of FIG. 1, the FMGS 160 may be any system that provides one or more of the following functions: autopilot, flight direction, auto throttle, and/or flight management (e.g., FMS functions). One of the functions that could be performed by the FMGS 160 could include the automated operation of the aircraft during an IAP to a runway of intended landing. As part of the procedure, the aircraft may reach a decision height (a known value of HATh) at which time the pilot may be required to make a decision to continue the approach to landing or begin a "missed approach" procedure. The FMGS 160 is known to those skilled in the art.

One of the embodiments presented herein discloses an altitude and/or height generating system for use onboard an aircraft during an approach-for-landing phase of flight. Barometric data from an air-data computer system may produce very accurate altitude measurements after correcting for local barometric pressure; however, barometric measurements may tend to have significant time latency. Moreover, the passage of weather fronts, the presence of non-standard temperatures, and other meteorological events could cause offsets in the altitude estimate if they occur between the aircraft and the barometric pressure reference point (such as an airport). The satellite navigation system with SBAS augmentation may provide accurate altitude information, but as stated above, small undetected satellite errors, terrain masking, or signal in space faults may cause errors in the altitude information, and fault detection using an SBAS could take several seconds for the ground stations to detect even a relatively large fault and relay this information to the aircraft.

This embodiment utilizes data from SBAS-aided satellite navigation system, an inertial system, a radar altimeter system, an air-data computer system, an object database, and a reference point database to generate altitude and/or height information. In this embodiment, an altitude estimate is generated by a processor by integrating barometric-aided vertical speed information from the inertial system and correcting the altitude estimate with an authority-limited weighted sum of barometric altitude and altitude derived from the sum of the terrain elevation from the object database and the height above ground from the radar altimeter. The weighting and authority limit values may be adjusted during the approach as a function of time and/or height above the runway to ensure an optimal altitude estimate. This altitude estimate may be used with the altitude information from the satellite navigation system to generate altitude and/or height information. This embodiment utilizes data from the radar altimeter system and terrain data from an object database, allowing for the system to take advantage of the accuracy of the radar altimeter at low altitudes; however, this heightened level of accuracy may not be required for some approach procedures, and terrain data with sufficient resolution, accuracy and fidelity may not be available. In such cases, the method disclosed below may be performed without the benefit of radar altimeter data and/or terrain data.

Figure 3:
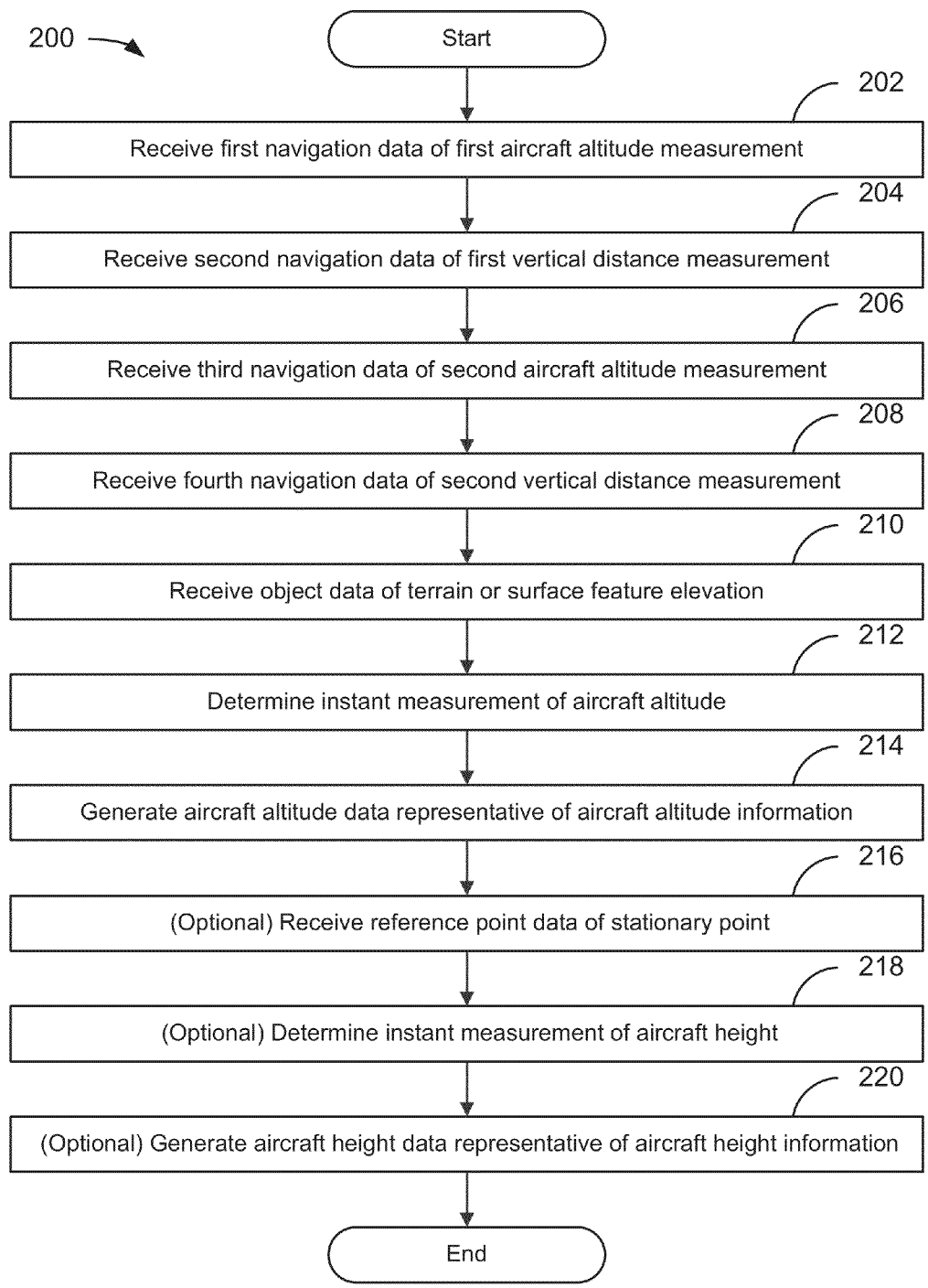
FIG. 3 depicts a flowchart of a method for generating altitude data.

Referring to FIG. 3 depicts flowchart 200 disclosing an example of a method for generating altitude data and height data optionally, where the processor 140 may be programmed or configured with instructions corresponding to the following modules embodied in flowchart 200. As embodied herein, the processor 140 may be a processor or a combination of processors found in the navigation data source 110, the object data source 130, the reference point data source 135, and/or the user system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowchart 200, the receiving of data is synonymous and/or interchangeable with the retrieving of data, and the providing of data is synonymous and/or interchangeable with the making available or supplying of data.

Figure 4:
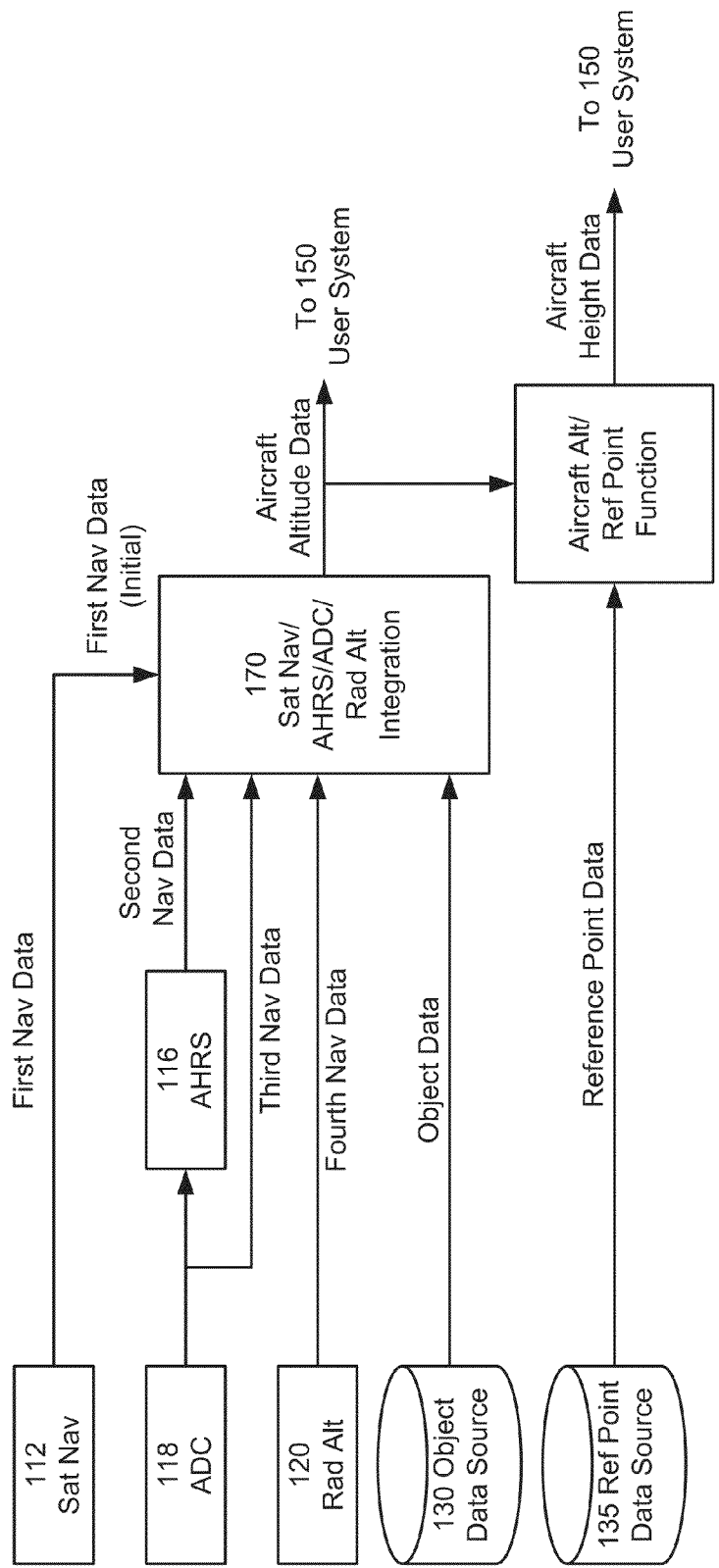
FIG. 4 depicts a data flow diagram of the method shown in FIG. 3.

As shown in FIGS. 3 and 4, the flowchart 200 and a data flow diagram are depicted, respectively. The flowchart begins with module 202 with the receiving of first navigation data, where such first navigation data may be comprised of externally-sourced navigation data provided by an external source (e.g., Sat Nav 112). The first navigation data may be representative of a first measurement of an aircraft altitude.

The flowchart continues with module 204 with the receiving of second navigation data, where such second navigation data may be comprised of internally-sourced navigation data provided by a first internal source (e.g., AHRS 116). The second navigation data may be representative of a first measurement of vertical distance (e.g., vertical travel of the aircraft).

The flowchart continues with module 206 with the receiving of third navigation data, where such third navigation data may be comprised of internally-sourced navigation data provided by a second internal source (e.g., ADS 118). The third navigation data may be representative of a second measurement of aircraft altitude.

The flowchart continues with module 208 with the receiving of fourth navigation data, where such fourth navigation data may be comprised of internally-sourced navigation data provided by a third internal source (e.g., Rad Alt). The second navigation data may be representative of a second measurement of vertical distance (e.g., height above terrain).

The flowchart continues with module 210 with the receiving of object data, where the object data may be comprised of data provided by the object data source 130. The object data may be representative of a predetermined or stored value of terrain or surface feature elevation.

The flowchart continues with module 212 with the determining of an instant measurement of aircraft altitude as a function of the first and second measurements of aircraft altitude, the first and second measurements of vertical distance, and the measurement of terrain or surface feature elevation. The function for determining of the instant measurement of aircraft altitude may be comprised of a first operation and continuous (i.e., real-time) second operations.

In the first operation, initial first navigation data and initial third navigation data may be used by an integration process 170 for initializing an instant measurement of aircraft altitude. In the continuous second operations, the second navigation data, third navigation data, fourth navigation data, and object data may be used by the integration process 170 to make continuous adjustments to the instant measurement of aircraft altitude.

When initializing the instant measurement of aircraft altitude, the integration process 170 could integrate an initial first measurement of aircraft altitude with an initial second measurement of aircraft altitude by one or more techniques known to those skilled in the art. For example, a statistical analysis could be performed on both initial measurements such as, but not limited to, the determination of an average of the initial measurements or a weighted average of the initial measurements, where the weights being applied to the initial measurements could correspond to measurements of data quality.

When making continuous adjustments to the instant measurement of aircraft altitude, the integration process 170 could integrate changes in second measurements of altitude data with changes in first measurements of vertical distance (which could be determined from vertical travel data) and changes in the sums of the second measurements of vertical distance (e.g., aircraft radar altimeter) and terrain of surface feature elevations represented in the object data by one or more techniques known to those skilled in the art. The resulting integrated measurements of vertical distance may be applied as adjustments to the instant measurement of aircraft altitude. As embodied herein, the series of second measurements of aircraft altitude, first measurements of vertical distance, and/or second measurements of vertical distance may be blended through the use of a blending algorithm.

The flowchart continues with module 214 with the generating of aircraft altitude data in response to the determination of the instant measurement of aircraft altitude, where the aircraft altitude data may be representative of aircraft altitude information. In one embodiment, the aircraft altitude data may be provided to the user system 150 such as, but not limited to, the presentation system 152, where the aircraft altitude information may be comprised of visual information, aural information, tactile information, or any combination thereof as configured by a manufacturer and/or end-user. Then, unless the optional modules of 216 through 220 are performed, the flowchart 200 proceeds to the end.

The flowchart continues with optional module 216 with the receiving of reference point data that may be provided by the reference point data source 135. As embodied herein, the reference point data may be comprised of elevation data representative of the elevation of the stationary reference point. In one embodiment, the stationary reference point could be an LTP of a runway.

The flowchart continues with optional module 218 with the determining of an instant measurement of aircraft height as a function of the elevation of the stationary reference point and the instant measurement of aircraft altitude. The function for determining of the instant measurement of aircraft height could be the subtraction of the elevation of the stationary reference point from the instant measurement of aircraft altitude.

The flowchart continues with module 220 with the generating of aircraft height data in response to the determination of the instant measurement of aircraft height, where the aircraft height data may be representative of aircraft height information; the aircraft height information may be comprised of visual information, aural information, tactile information, or any combination thereof as configured by a manufacturer and/or end-user. In one embodiment, the aircraft height data may be provided to the user system 150 such as, but not limited to, the presentation system 152. Then, the flowchart 200 proceeds to the end.

Referring to the drawings of FIG. 5, flowchart 300 is depicted disclosing an example of a method for generating ILS-based altitude data and height data optionally, where the processor 140 may be programmed or configured with instructions corresponding to the following modules embodied in flowchart 300. As embodied herein, the processor 140 may be a processor or a combination of processors found in the navigation data source 110, the object data source 130, the reference point data source 135, the ILS deviation data source 138, and/or the user system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

Figure 5A:
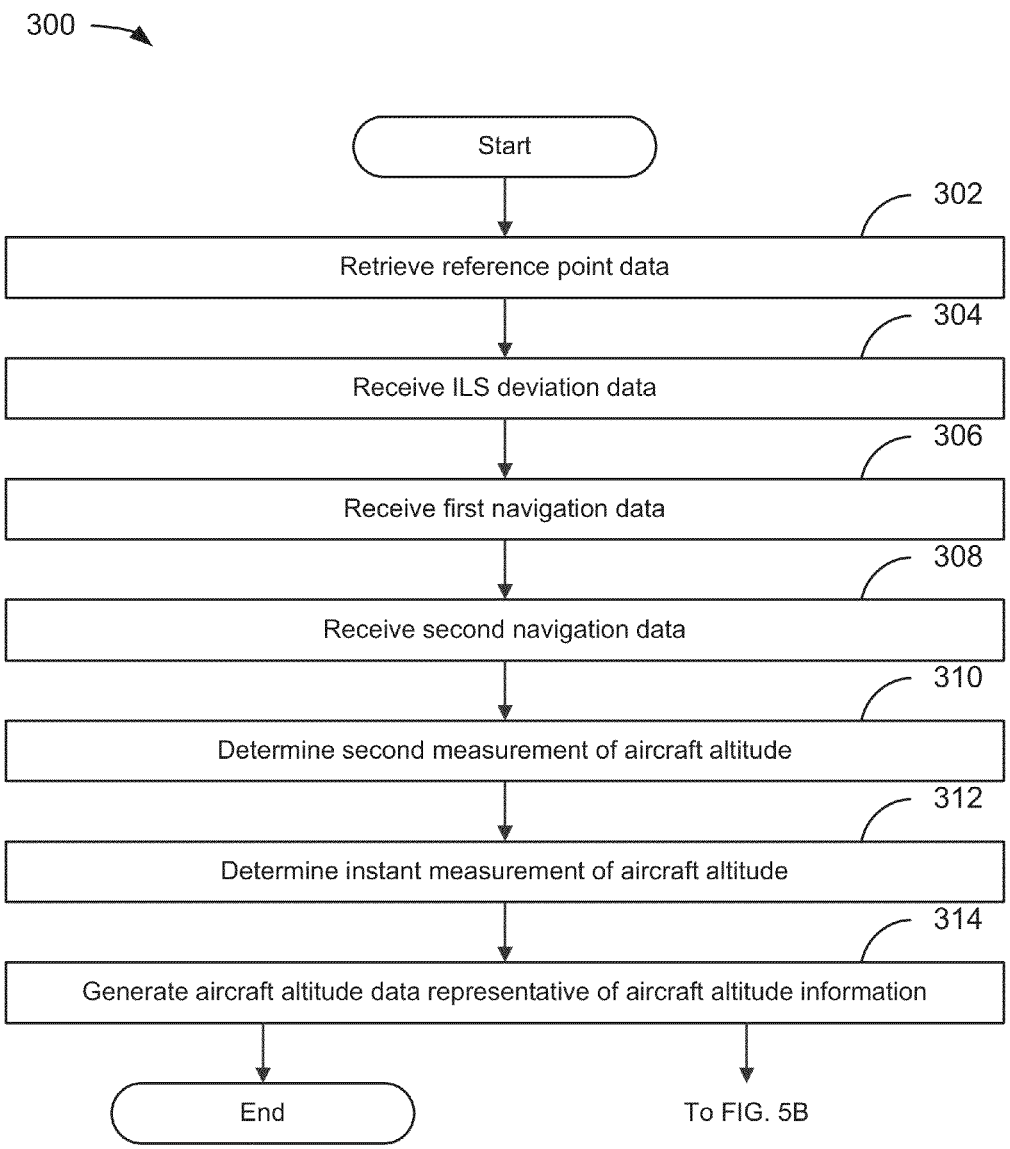
FIG. 5A depicts modules of a flowchart of a method for generating ILS-based altitude data.

Referring to FIG. 5A, the flowchart 300 and a data flow diagram are depicted, respectively. The flowchart begins with module 302 with the retrieving of reference point data corresponding to an ILS ground-based glide slope transmitter. The flowchart continues with module 304 with the receiving of ILS deviation data comprised of at least glide slope measurement data.

The flowchart continues with module 306 with the receiving of first navigation data, where such first navigation data may be comprised of externally-sourced navigation data provided by an external source (e.g., Sat Nav 112), internally-sourced navigation data provided by an internal source (e.g., AHRS 116), or a combination and/or blending of both using one or more techniques known to those skilled in the art. The first navigation data may be representative of a measurement of an aircraft geographic position.

The flowchart continues with module 308 with the receiving of second navigation data, where such second navigation data may be comprised of externally-sourced navigation data provided by an external source (e.g., Sat Nav 112), internally-sourced navigation data provided by a first internal source (e.g., ADS 118), or a combination and/or blending of both. The second navigation data may be representative of a first measurement of aircraft altitude.

As embodied herein, the second navigation data may be comprised of integrated altitude data of FIGS. 3 and 4 generated by a second processor configured to generated integrated altitude data. As embodied herein, the second processor could be comprised of processor 140.

Figure 6:
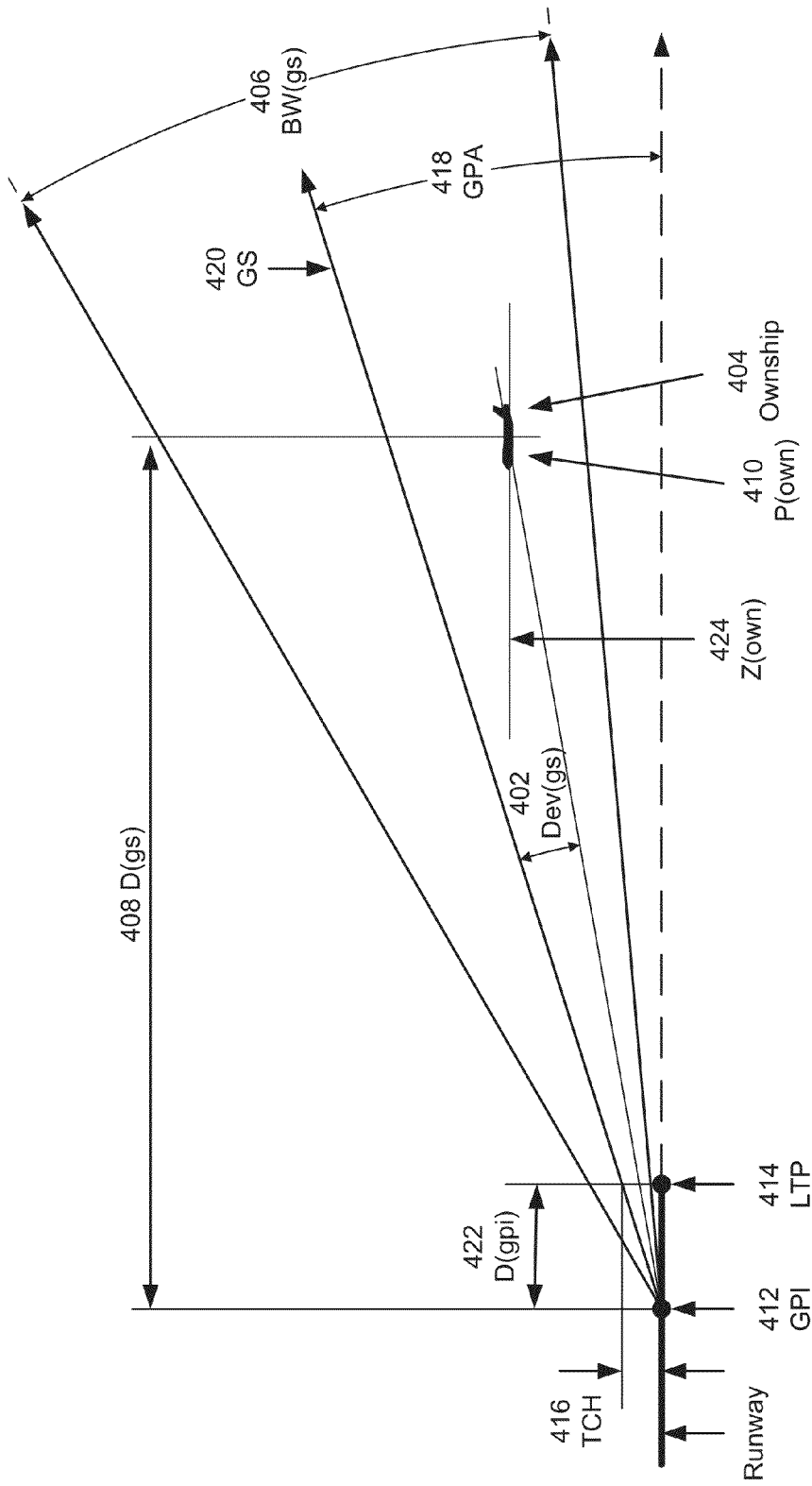
FIG. 6 depicts ILS-based measurements.

The flowchart continues with module 310 with the determining of a second measurement of aircraft altitude as a function of the ILS deviation data, the reference point data, and the first navigation data. Referring to FIG. 6, glide slope deviation angle Dev(gs) 402 of ownship 404 may be determined as a function of the reference point data and the ILS deviation data. Using glide slope beam width BW(gs) 406 and ILS deviation data representative of a glide slope measurement, Dev(gs) 402 may be determined.

Then, a distance D(gs) 408 between the geographic position of ownship P(own) 410 and the position of a ground point intercept GPI 412 may be determined as a function of first navigation data and reference point data. In one embodiment, GPI 412 could be represented by the latitude/longitude and elevation information of the glide slope transmitter. In another embodiment, GPI 412 may be determined from other reference point data. In one example, GPI 412 may be determined from data representative of information corresponding to the landing threshold position LTP 414 (e.g., latitude/longitude and elevation), threshold crossing height ("TCH") 416, glide path angle GPA 418 of the glide slope ("GS") 420 produced by the glide slope transmitter, and the direction of the runway. The distance D(gpi) 422 between the GPI 412 and the LTP 414 can be determined as the quotient of the TCH 416 divided by the tangent of the GPA 418; then, the GPI 412 could be determined by applying D(gpi) 422 as an offset from the LTP 416 in the direction of the runway.

Then, an altitude Z(own) 424 of ownship 404 may be determined as a function of Dev(gs) 402, D(gs) 408, GPI 412, and GPA 418. For example, if the glide slope deviation measurement indicates that ownship 404 is below the glide slope, Z(own) 424 may be determined as the sum of the elevation of GPI 412 and the product of D(gs) 408 and the tangent of the difference between GPA 418 and Dev(gs) 402; similarly, if the glide slope deviation measurement indicates that ownship 404 is above the glide slope, Z(own) 424 may be determined as the sum of the elevation of GPI 412 and the product of D(gs) 408 and the tangent of the sum of GPA 418 and Dev(gs) 402.

Returning to FIG. 5A, the flowchart continues with module 312 with the determining of an instant measurement of aircraft altitude as a function of the first and second measurements of aircraft altitude by one or more techniques known to those skilled in the art. For example, a statistical analysis could be performed on the first and second measurements such as, but not limited to, the determination of an average or a weighted average, where the weights being applied to the first and second measurements could correspond to measurements of data quality.

The flowchart continues with module 314 with the generating of aircraft altitude data in response to the determination of the instant measurement of aircraft altitude, where the aircraft altitude data may be representative of aircraft altitude information. In one embodiment, the aircraft altitude data may be provided to the user system 150 such as, but not limited to, the presentation system 152, where the aircraft altitude information may be comprised of visual information, aural information, tactile information, or any combination thereof as configured by a manufacturer and/or end-user. Then, unless the optional modules of 316 through 320 and modules 322 through 326 are performed, the flowchart 300 proceeds to the end.

Figure 5B:
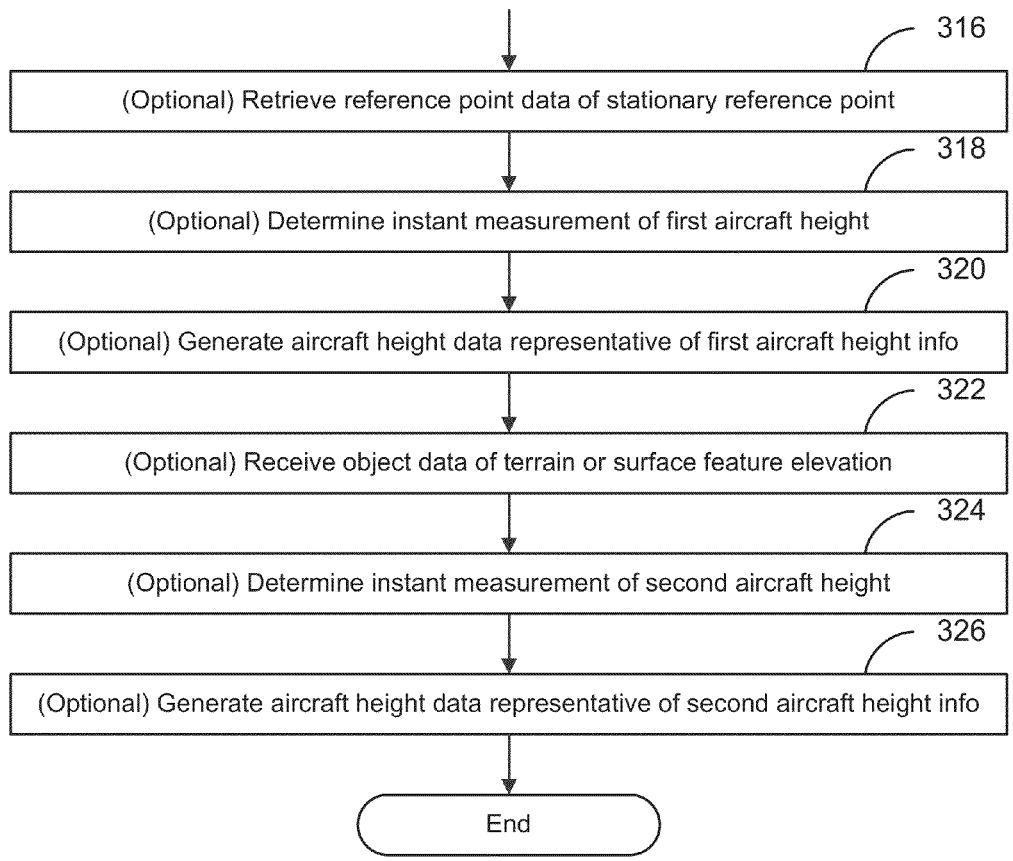
FIG. 5B depicts optional modules of a flowchart of a method for generating ILS-based altitude data.

The flowchart continues with optional module 316 or optional module 322 shown in FIG. 5B. Optional module 316 is comprised of the retrieving of reference point data that may be provided by the reference point data source 135. As embodied herein, the reference point data may be comprised of elevation data representative of the elevation of the stationary reference point. In one embodiment, the stationary reference point could be an LTP of a runway.

The flowchart continues with optional module 318 with the determining of an instant measurement of first aircraft height as a function of the elevation of the stationary reference point and the instant measurement of aircraft altitude. The function for determining of the instant measurement of first aircraft height could be the subtraction of the elevation of the stationary reference point from the instant measurement of aircraft altitude.

The flowchart continues with module 320 with the generating of first aircraft height data in response to the determination of the instant measurement of aircraft height, where the first aircraft height data may be representative of first aircraft height information. In one embodiment, the first aircraft height data may be provided to the user system 150 such as, but not limited to, the presentation system 152, where the first aircraft height information may be comprised of visual information, aural information, tactile information, or any combination thereof as configured by a manufacturer and/or end-user. Then, unless optional modules 322 through 326 are performed, the flowchart 300 proceeds to the end.

The flowchart continues with optional module 322 with the retrieving of object data that may be provided by the object data source 130. As embodied herein, the object data may be comprised of elevation data representative of the elevation of the terrain or surface feature corresponding to the aircraft geographic position. In one embodiment, the terrain or surface feature could be the terrain or surface feature underlying the aircraft.

The flowchart continues with optional module 324 with the determining of an instant measurement of second aircraft height as a function of the elevation of the terrain or surface feature and the instant measurement of aircraft altitude. The function for determining of the instant measurement of second aircraft height could be the subtraction of the elevation of the terrain or surface feature from the instant measurement of aircraft altitude.

The flowchart continues with module 326 with the generating of second aircraft height data in response to the determination of the instant measurement of second aircraft height, where the second aircraft height data may be representative of second aircraft height information. In one embodiment, the second aircraft height data may be provided to the user system 150 such as, but not limited to, the presentation system 152, where the second aircraft height information may be comprised of visual information, aural information, tactile information, or any combination thereof as configured by a manufacturer and/or end-user. Then, the flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating aircraft altitude data, such system comprising:

a source of reference point data;

a source of instrument landing system ("ILS") deviation
data;
at least one source of navigation data; and
a processor configured to
retrieve reference point data,
receive ILS deviation data,
receive first navigation data from a system in which
navigation data is derived from inertial sensors, where
the first navigation data is representative of a measurement of aircraft geographic position,
receive second navigation data from either
a satellite navigation system,
a system in which navigation data is derived from pitot-static system sensors, or
a combination of both, where
the second navigation data is representative of a first measurement of aircraft altitude,
determine a second measurement of aircraft altitude as a function of
the reference point data,
the ILS deviation data, and
the first navigation data,
determine an instant measurement of aircraft altitude as a function of
the first measurement of aircraft altitude, and
the second measurement of aircraft altitude, and
generate aircraft altitude data responsive to the determination of the instant measurement of aircraft altitude, where
the aircraft altitude data is representative of aircraft altitude information.

2. The system of claim 1, further comprising: a presentation system configured to
receive the aircraft altitude data from the processor, where
the processor has been further configured to provide the aircraft altitude data to the presentation system, and
present the aircraft altitude information represented in the aircraft altitude data, whereby
the aircraft altitude information is presented
visually on the screen of a display unit,
aurally through an aural alert unit,
tactilely through a tactile alert unit, or
any combination thereof.

3. The system of claim 1, wherein
the processor is further configured to
determine an instant measurement of first aircraft height as a function of
reference point data representative of the elevation of a stationary reference point, and
the instant measurement of aircraft altitude, and
generate first aircraft height data responsive to the determination of the instant measurement of first aircraft height, where
the first aircraft height data is representative of first aircraft height information.

4. The system of claim 3, wherein
the stationary reference point is a landing threshold point of a runway, and
the instant measurement of first aircraft height is an instant height above the landing threshold.

5. The system of claim 3, further comprising:
a presentation system configured to
receive the first aircraft height data from the processor, where
the processor has been further configured to provide the first aircraft height data to the presentation system, and
present the first aircraft height information represented in the first aircraft height data, whereby
the first aircraft height information is presented
visually on the screen of a display unit,
aurally through an aural alert unit,
tactilely through a tactile alert unit, or
any combination thereof.

6. The system of claim 1, further comprising:
a source of object data, where
the processor is further configured to
retrieve object data representative of a value of terrain or surface feature elevation,
determine an instant measurement of second aircraft height as a function of
the object data, and
the instant measurement of aircraft altitude, and
generate second aircraft height data responsive to the determination of the instant measurement of second aircraft height, where
the second aircraft height data is representative of second aircraft height information.

7. The system of claim 6, wherein
the terrain or surface feature elevation corresponds to the measurement of aircraft geographic position, and
the instant measurement of second aircraft height is an instant height above the underlying terrain or surface feature.

8. The system of claim 6, further comprising: a presentation system configured to
receive the second aircraft height data from the processor, where
the processor has been further configured to provide the second aircraft height data to the presentation system, and
present the second aircraft height information represented in the second aircraft height data, whereby
the second aircraft height information is presented
visually on the screen of a display unit,
aurally through an aural alert unit,
tactilely through a tactile alert unit, or
any combination thereof.

9. A device for generating aircraft altitude data, such device comprising:
a processor configured to
retrieve reference point data;
receive instrument landing system ("ILS") deviation data;
receive first navigation data from a system in which navigation data is derived from inertial sensors, where
the first navigation data is representative of a measurement of aircraft geographic position;
receive second navigation data from either
a satellite navigation system,
a system in which navigation data is derived from pitot-static system sensors, or
a combination of both, where
the second navigation data is representative of a first measurement of aircraft altitude;
determine a second measurement of aircraft altitude as a function of
the reference point data,
the ILS deviation data, and
the first navigation data;
determine an instant measurement of aircraft altitude as a function of
the first measurement of aircraft altitude, and
the second measurement of aircraft altitude; and generate aircraft altitude data responsive to the determination of the instant measurement of aircraft altitude, where
the aircraft altitude data is representative of aircraft altitude information.

10. The device of claim 9, wherein
the processor is further configured to
provide the aircraft altitude data to the presentation system, whereby
the aircraft altitude information is presented
visually on the screen of a display unit,
aurally through an aural alert unit,
tactilely through a tactile alert unit, or
any combination thereof.

11. The device of claim 9, wherein
the processor is further configured to
determine an instant measurement of first aircraft height as a function of
reference point data representative of the elevation of a stationary reference point, and
the instant measurement of aircraft altitude; and
generate first aircraft height data responsive to the determination of the instant measurement of first aircraft height, where
the first aircraft height data is representative of first aircraft height information.

12. The device of claim 9, wherein
the processor is further configured to
retrieve object data representative of a value of terrain or surface feature elevation;
determine an instant measurement of second aircraft height as a function of
the object data, and
the instant measurement of aircraft altitude; and
generate second aircraft height data responsive to the determination of the instant measurement of second aircraft height, where
the second aircraft height data is representative of second aircraft height information.

13. A method for generating aircraft altitude data, such method comprising:
retrieving reference point data;
receiving instrument landing system ("ILS") deviation data;
receiving first navigation data from a system in which navigation data is derived from inertial sensors, where
the first navigation data is representative of a measurement of aircraft geographic position;
receiving second navigation data from either
a satellite navigation system,
a system in which navigation data is derived from Pitot-static system sensors, or
a combination of both, where
the second navigation data is representative of a first measurement of aircraft altitude;
determining a second measurement of aircraft altitude as a function of
the reference point data,
the ILS deviation data, and
the first navigation data;
determining an instant measurement of aircraft altitude as a function of
the first measurement of aircraft altitude, and
the second measurement of aircraft altitude; and
generating aircraft altitude data responsive to the determination of the instant measurement of aircraft altitude, where
the aircraft altitude data is representative of aircraft altitude information.

14. The method of claim 13, further comprising:
determining an instant measurement of first aircraft height as a function of
reference point data representative of the elevation of a stationary reference point, and
the instant measurement of aircraft altitude, and
generating first aircraft height data responsive to the determination of the instant measurement of first aircraft height, where
the first aircraft height data is representative of first aircraft height information.

15. The method of claim 13, further comprising:
retrieving object data representative of a value of terrain or surface feature elevation, determining an instant measurement of second aircraft height as a function of
the object data, and
the instant measurement of aircraft altitude, and
generating second aircraft height data responsive to the determination of the instant measurement of second aircraft height, where
the second aircraft height data is representative of second aircraft height information.

16. A system for generating aircraft altitude data, such system comprising:
a source of reference point data;
a source of instrument landing system ("ILS") deviation data;
at least one source of navigation data; and
a first processor configured to
retrieve reference point data,
receive ILS deviation data,
receive first navigation data representative of a measurement of aircraft geographic position,
receive second navigation data from a second processor configured to
determine the first measurement of aircraft altitude from a plurality of navigation data sources including
at least one external navigation data source, and
at least one internal navigation data source, where
the second navigation data is representative of a first measurement of aircraft altitude,
determine a second measurement of aircraft altitude as a function of
the reference point data,
the ILS deviation data, and
the first navigation data,
determine an instant measurement of aircraft altitude as a function of
the first measurement of aircraft altitude, and
the second measurement of aircraft altitude, and
generate aircraft altitude data responsive to the determination of the instant measurement of aircraft altitude, where
the aircraft altitude data is representative of aircraft altitude information.

17. The system of claim 16, wherein the first processor and the second processor are comprised of the same processor.

18. The system of claim 16, further comprising:
a presentation system configured to
receive the aircraft altitude data from the first processor, where
the first processor has been further configured to provide the aircraft altitude data to the presentation system, and present the aircraft altitude information represented in
the aircraft altitude data, whereby
the aircraft altitude information is presented
visually on the screen of a display unit,
aurally through an aural alert unit,
tactilely through a tactile alert unit, or
any combination thereof.

19. The system of claim 16, wherein
the first processor is further configured to
determine an instant measurement of first aircraft height as a function of
reference point data representative of the elevation of a stationary reference point, and
the instant measurement of aircraft altitude, and
generate first aircraft height data responsive to the determination of the instant measurement of first aircraft height, where
the first aircraft height data is representative of first aircraft height information.

20. The system of claim 19, wherein
the stationary reference point is a landing threshold point of a runway, and
the instant measurement of first aircraft height is an instant height above the landing threshold.

21. The system of claim 19, further comprising:
a presentation system configured to
receive the first aircraft height data from the first processor, where
the first processor has been further configured to provide the first aircraft height data to the presentation system, and
present the first aircraft height information represented in the first aircraft height data, whereby
the first aircraft height information is presented
visually on the screen of a display unit,
aurally through an aural alert unit,
tactilely through a tactile alert unit, or
any combination thereof.

22. The system of claim 16, further comprising:
a source of object data, where
the first processor is further configured to
retrieve object data representative of a value of terrain or surface feature elevation,
determine an instant measurement of second aircraft height as a function of
the object data, and
the instant measurement of aircraft altitude, and
generate second aircraft height data responsive to the determination of the instant measurement of second aircraft height, where
the second aircraft height data is representative of second aircraft height information.

23. The system of claim 22, wherein
the terrain or surface feature elevation corresponds to the measurement of aircraft geographic position, and
the instant measurement of second aircraft height is an instant height above the underlying terrain or surface feature.

24. The system of claim 22, further comprising:
a presentation system configured to
receive the second aircraft height data from the first processor, where
the first processor has been further configured to provide the second aircraft height data to the presentation system, and
present the second aircraft height information represented in the second aircraft height data, whereby
the second aircraft height information is presented
visually on the screen of a display unit,
aurally through an aural alert unit,
tactilely through a tactile alert unit, or
any combination thereof.

25. A method for generating aircraft altitude data, such method comprising:
retrieving reference point data;
receiving instrument landing system ("ILS") deviation data;
receiving first navigation data representative of a measurement of aircraft geographic position from a source of first navigation data;
receiving second navigation data from a processor configured to
determine the first measurement of aircraft altitude from a plurality of navigation data sources including
at least one external navigation data source, and
at least one internal navigation data source, where
the second navigation data is representative of a first measurement of aircraft altitude;
representative of a first measurement of aircraft altitude from a source of second navigation data;
determining a second measurement of aircraft altitude as a function of
the reference point data,
the ILS deviation data, and
the first navigation data;
determining an instant measurement of aircraft altitude as a function of
the first measurement of aircraft altitude, and
the second measurement of aircraft altitude; and
generating aircraft altitude data responsive to the determination of the instant measurement of aircraft altitude, where
the aircraft altitude data is representative of aircraft altitude information.

26. The method of claim 25, further comprising:
determining an instant measurement of first aircraft height as a function of
reference point data representative of the elevation of a stationary reference point, and
the instant measurement of aircraft altitude, and
generating first aircraft height data responsive to the determination of the instant measurement of first aircraft height, where
the first aircraft height data is representative of first aircraft height information.

27. The method of claim 25, further comprising:
retrieving object data representative of a value of terrain or surface feature elevation,
determining an instant measurement of second aircraft height as a function of
the object data, and
the instant measurement of aircraft altitude, and
generating second aircraft height data responsive to the determination of the instant measurement of second aircraft height, where
the second aircraft height data is representative of second aircraft height information.

* * * * *